(12) United States Patent
Yokota

(10) Patent No.: US 6,986,493 B2
(45) Date of Patent: Jan. 17, 2006

(54) SLIDE DEVICE FOR AUTOMOTIVE SEAT

(75) Inventor: Masaaki Yokota, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 10/795,278

(22) Filed: Mar. 9, 2004

(65) Prior Publication Data

US 2004/0222348 A1    Nov. 11, 2004

(30) Foreign Application Priority Data

May 9, 2003    (JP)    ............................. 2003-131103

(51) Int. Cl.
   *F16M 13/00*    (2006.01)
(52) U.S. Cl. ..................................... 248/429; 248/424
(58) Field of Classification Search ............... 248/429, 248/430, 424; 297/340, 362, 344.1, 374, 297/336, 346
   See application file for complete search history.

(56) References Cited

U.S. PATENT DOCUMENTS

| | | | | |
|---|---|---|---|---|
| 4,364,536 A | * | 12/1982 | Kluting | ...................... 248/429 |
| 4,487,391 A | * | 12/1984 | Rampel et al. | ............. 248/429 |
| 5,707,035 A | * | 1/1998 | Kargol et al. | ............... 248/429 |
| 5,909,866 A | * | 6/1999 | Vaidyanathan et al. | ..... 248/429 |
| 5,938,164 A | * | 8/1999 | Kargol et al. | ................ 248/429 |
| 6,499,712 B1 | * | 12/2002 | Clark et al. | .................. 248/429 |

FOREIGN PATENT DOCUMENTS

| | | |
|---|---|---|
| JP | 9-277856 | 10/1997 |
| JP | 11-11186 | 1/1999 |

* cited by examiner

*Primary Examiner*—Kimberly Wood
*Assistant Examiner*—Amy J. Sterling
(74) *Attorney, Agent, or Firm*—Browdy and Neimark, PLLC

(57) ABSTRACT

A seat slide device including two slide assemblies each having an upper slide element which is slid by a drive unit along a lower track element via a flexible drive transmission element. The drive unit is provided in the seat and the flexible drive transmission element is arranged between the drive unit and two slide assemblies, such that a part of the flexible drive transmission element extends along a direction in which the two slide assemblies extend. An auxiliary flexible drive transmission element may be added to insure imparting a drive force to the upper slide element. A lock operation/control system is provided to insure precise locking and unlocking of the upper slide element with respect to the lower track element, while simultaneously effecting selective switch-over operation of the drive unit to cause forward and backward movement of the upper slide element along the lower track element.

17 Claims, 6 Drawing Sheets

FIG. 5
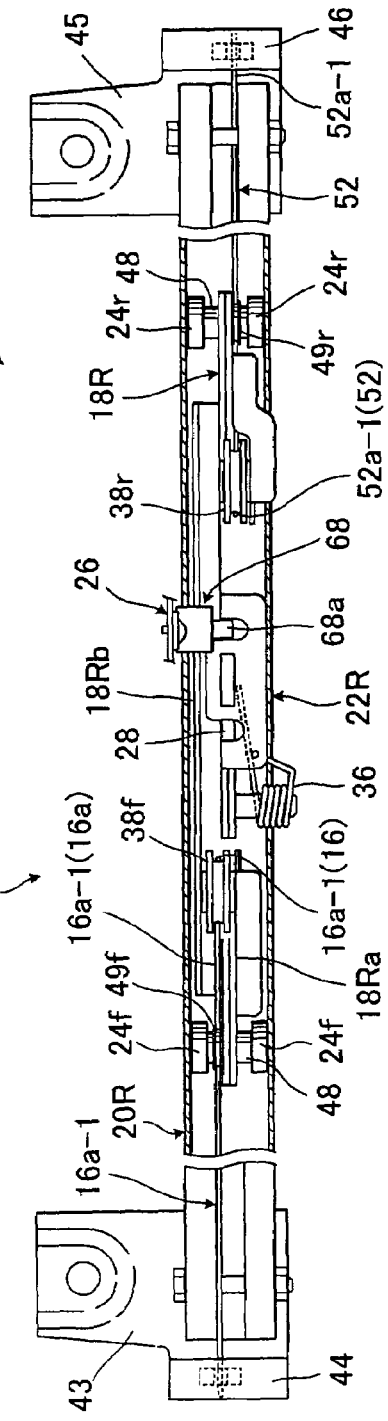
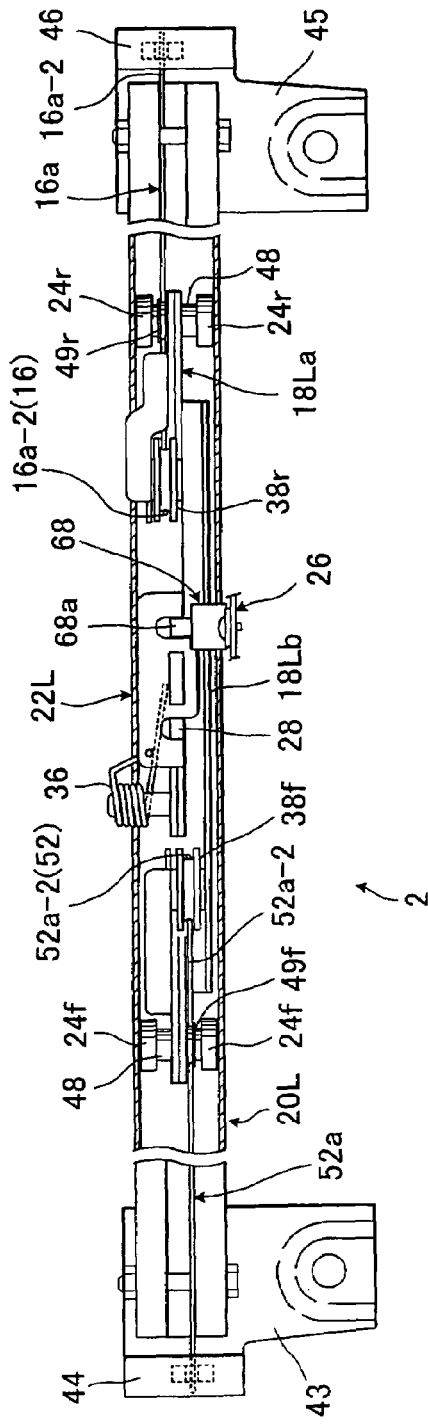

SLIDE DEVICE FOR AUTOMOTIVE SEAT

BACKGROUND OF THE INVENTION

1. Field of the Invention

The present invention relates to a slide device for vehicle or automotive seat, which allows a vehicle or automotive seat to be slidingly movable via a slide rail structure in the fore-and-aft direction. In particular, the invention is directed to a powered long slide device for vehicle or automotive seat, wherein an upper slide element on which the seat is mounted is slidingly moved by a motor and control system on and along a long lower track element fixed on the floor of vehicle or automobile.

2. Description of Prior Art

In general, a long slide device is used, for instance, in a van-type automobile, such as a mini-van car or the like, the long slide device normally comprising a pair of lower track elements or lower rails of a relatively large length, i.e. a long lower ail, suited for mounting on an enlarged rear cabin space in the mini-van car, and a pair of upper slide elements or upper rails slidably fitted in the long lower rail. An automotive seat is fixedly mounted on the pair of upper rails, and therefore, the seat can be slidingly moved on and along the pair of long lower rails forwardly and backwardly in the wide rear space in the van-type automobile.

But, it is a troublesome labor for a user to manually move the seat along such long lower rails. For that reason, there has been made available a powered long slide rail device which employs motors and electrical control systems to cause forward and backward sliding movement of the upper rails on and along the lower rails.

For example, such powered long slide rail device has been disclosed from the Japanese Laid-Open Patent Publication No. 11-11186, according to which, a long lead screw element is fixed to and along a long lower rail, whereas a rotary nut element, very short relative to such long lead screw element, is provided in an upper rail so as to be in a partial threaded engagement with the long lead screw element, the rotary nut element being rotated by a motor under an electrical control, so that operation of the motor causes rotation of the rotary nut element about the lead screw element. Naturally, the rotary nut element is moved in either of forward and backward directions on and along the lead screw element, thereby causing relative forward and backward movement of the upper rail (or seat) on and along the long rail.

Incidentally, by and large, the body of automobile, in which the slide rail device is installed, is formed by putting together a plurality of panels and plate members as by spot welding. Due to such spot welding, distortion and twisting may frequently occur among those panels and plate members, resulting in a structural deformation or error in shape of the automobile body as well as in the floor of the automobile.

When it comes to mounting the foregoing long lower rail disclosed in the Patent Pub. No. 11-11186 upon the floor of automobile, the foregoing structural deformation or error in shape of automobile body will cause undesired deformation in the long lower rail because the fragility of the long lower rail becomes greater with its increased length and also cause undesired torsion or twisting in the lead screw element. Hence, it is highly possible that the threaded engagement between the rotary nut element and the lead screw element will become poor, which will make it difficult to keep a smooth relative movement of the rotary nut element along the lead screw element. Further, in the case where a seat belt is connected with the upper rail in which the rotary nut element is provided, it is of a great likelihood that a great upward load applied from the seat belt to the upper rail in such an emergency case as a collision will forcibly draw the rotary nut element upwardly from the long lead screw element, as a result of which, the long lead screw element will be bent or deformed, and therefore, it will be even much difficult to repair the slide rail device for re-use purpose.

The same goes for the case where rack and pinion gears are employed in the long slide rail device, because the rack gear has to be long for mount in and along the long lower rail and will become vulnerable to a local great load applied from the pinion gear which is connected with the upper rail, thus encountering the same problems as stated above about the combination of lead screw and rotary nut elements.

In view of the above-described problems, it is possible to use a tape-type transmission mechanism in a powered slide rail device, for example, which uses elastic tapes as a transmission means for causing relative movement between upper and lower rails, as disclosed from the Japanese Laid-Open Patent Publication No. 9-277856. According thereto, tapes are movably connected between the upper rail and a motor drive mechanism including a drive pulley with which the tapes are partially engaged, so that operation of the motor drive mechanism causes rotation of the drive pulley to move the upper rails forwardly on and along the lower rail. However, application of this prior art mechanism to the long slide rail device will raise the following problems: (i) As stated above, the mechanism disclosed is for moving the upper rails only in the forward direction along the lower rail, not moved backwardly. To enable forward and backward movement of the upper rails, the construction and operation systems of the associated drive mechanism will become quite complicated, and (ii) Since the tape used is long and partially engaged with the drive pulley, a free end portion of the tape extends outwardly from the drive pulley to a greater length than required, which is indeed true of the long slide rail. That is, because of the long lower rail, long tapes are used to cause translation of the upper rail in a long distance along that long lower rail, as a result of which, it is troublesome and difficult to store the free end portions of the long tapes, and in that case, a whole structure of slide rail device will be rather complicated, with an increased number of parts and a high cost involved. Further, the Pub. No. 9-277856 shows a locking device having a plurality of lock holes and a lock plate being engageable into a selected one of the lock holes, but no description is given about such locking device. In other word, this prior art is entirely silent for an interlocking relation between the locking device and the foregoing tape-type transmission mechanism, and therefore, it is impossible with that prior art system to insure locking engagement of the lock plate into a selected one of plural lock holes in a good-timed interlocking relation with the forward and backward sliding movement of the upper rail along the lower rail.

SUMMARY OF THE INVENTION

In view of the above-stated drawbacks, it is a primary purpose of the present invention to provide an improved slide device (or powered slide device) which is suited for a long slide device, wherein its drive transmission for causing an upper slide element to move along an long lower track element is not affected by a structural error of automobile body or floor and not affected by a deformation or twisting of the long lower track element due to a collision case or the like, neither, with an easy-to-operate locking/switching mechanism for effecting a locking/unlocking action of the upper slide element with respect to the lower track element and causing forward and backward movement of the upper slide element along the lower track element at the same time.

In order to achieve such purpose, a slide device in accordance with the present invention is basically comprised of:

a first slide assembly comprising a first lower track elements fixed on said floor and a first upper slide elements slidably engaged on the first lower track elements so as to be movable therealong in forward and backward directions, the first upper slide elements being connected with the seat;

a second slide assembly comprising a second lower track elements fixed on the floor and a second upper slide elements slidably engaged on the second lower track elements so as to be movable therealong in forward and backward directions, the second upper slide elements being connected with the seat;

a drive means provided at said seat, the drive means being operable in one of a normal direction and a reverse direction;

a flexible drive transmission means operatively and flexibly connected among the first and second slide assemblies and the drive means so as to allow a drive force of said drive means to be transmitted to said first and second upper slide elements, said flexible drive transmission means having one end and another end which are fixed to a side of said floor and being so arranged that a part of the flexible drive transmission means extends along a direction in which said first and second slide assemblies extend, with such an arrangement that, upon operation of the drive means in the normal direction, a corresponding normal drive force is transmitted through the flexible drive transmission means to the pair of upper slide elements, thereby causing movement of both first and second upper slide elements in the forward direction along the respective said first and second lower track elements, and that, upon operation of the drive means in the reverse direction, a corresponding reverse drive force is transmitted through the flexible drive transmission means to each of said first and second upper slide elements, thereby causing movement of both said first and second upper slide elements in the backward direction along the first and second lower track elements;

a locking means operable for locking and unlocking said first and second upper slide elements to and from the respective said first and second lower track elements;

a lock operation/control means arranged between the locking means and the drive means, the lock operation/control means being normally set in a locking position and operable therefrom toward one of normal unlocking position and reverse unlocking position, such that, when the lock operation/control means is set in the locking position, both of the drive and locking means are in an inoperative state, that operation of the lock operation/control means in the normal unlocking position causes the locking means to unlock said first and second upper slide elements from the respective said first and second lower track elements, while simultaneously activating the drive means to operate in the normal direction, and that operation of the lock operation/control means in the reverse unlocking direction causes the locking means to unlock the pair of upper slide elements from the pair of lower track elements, while simultaneously activating the drive means to operate in the reverse direction;

the lock operation/control means including:

a lock operation means operable to a selected one of a first unlocking position and second unlocking position in relation to a neutral locking position, the lock operation means being operatively connected with the locking means, and being normally sent in the neutral unlocking position, wherein the first unlocking position and the second locking position correspond to the normal and reverse unlocking directions, respectively; and a start switch means operable to a selected one of a normal switch-on position and a reverse switch-on position in relation to a neutral switch-off position, the start switch being electrically connected with the drive means and being normally set in the neutral switch-off position, wherein the normal and reverse switch-on positions correspond to the normal and reverse directions associated with the drive means, respectively, with such an arrangement that, when the lock operation/control means is set in the locking position, the lock operation means and the start switch means being set in the neutral locking position and the neutral switch-off position, respectively, whereby the first and second upper slide elements are locked to the respective said first and second lower track elements, that, when the lock operation/control means is operated in the normal unlocking direction, the lock operation means is operated in the first unlocking position to cause operation of the locking means to unlock the first and second slide elements from the respective first and second lower track element, while simultaneously, the start switch means is operated to the normal switch-on position, which in turn causes the drive means to operate in the normal direction, thereby causing movement of the pair of upper slide elements in the forward direction along the pair of lower track elements through the flexible drive transmission means, and that, when the lock operation/control means is operated in the reverse unlocking direction, the lock operation means is operated in the second unlocking position to cause operation of the locking means to unlock the upper slide element from the lower track element, while simultaneously, the start switch means is operated to the reverse switch-on position, which in turn causes the drive means to operate in the reverse direction, thereby causing movement of said first and second upper slide elements in the backward direction along the respective first and second lower track elements through the flexible drive transmission means.

Other various features and advantages of the present invention will become apparent from reading of the description, hereinafter, with reference to the annexed drawings.

BRIEF DESCRIPTION OF THE DRAWINGS

FIG. 5 is a partly broken schematic plan view showing a part of the principal parts in the first mode of seat slide device shown in FIG. 1;

DETAILED DESCRIPTION OF PREFERRED EMBODIMENT OF THE INVENTION

Referring to FIGS. 1 through 8, there are illustrated preferred modes of a long seat slide device in accordance with the present invention, wherein the long seat slide device, generally designated by (10), is of a powered type provided with a motor for electrical operation to cause sliding movement of an upper rail along a long lower rail in forward and backward directions.

In this context, it is noted that, hereinafter, the wording, "forward direction" or "forwardly", and the wording, "backward direction" or "backwardly", shall refer to a direction to the forward side (F) of seat (S) and a direction to a backward side (B) of seat (S), respectively. The seat (S) is a bench seat as used in a rear seat, or the like.

Figure 1:
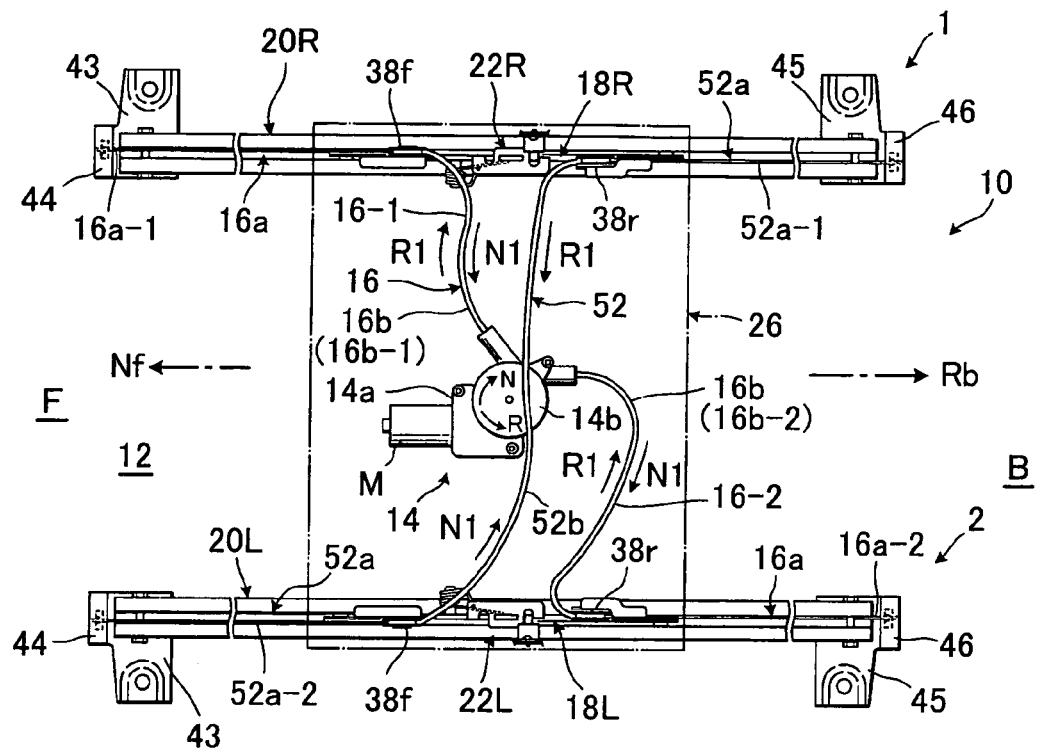
FIG. 1 is a partly broken schematic plan view showing a principal part including drive transmission elements in first exemplary mode of seat slide device in accordance with the present invention.

Reference is now made to FIG. 1 which shows one exemplary mode of the seat slide device (10) in which are provided a first slide assembly (1) on the right side and a second slide assembly (2) on the left side, as known in the art.

Generically stated, the first slide assembly (1) comprises a first long lower track element (20R) and a first upper slide element (18R) slidably engaged on the first long lower track element (20R), on the right side, while on the other hand, the second slide assembly (2) comprises a second long lower track element (20L) and a second upper slide element (18L) slidably engaged on the second long lower track element (20L), on the left side. Hereinafter, the first and second long lower track elements (20R) (20L) shall be embodied by first and second long lower rails (20R) (20L), respectively, whereas the first and second upper slide elements (18R) (18L) be embodied by first and second lower rails (18R) (18L), respectively.

Reference is now made to FIG. 1 which shows one exemplary mode of the seat slide device (10) in which are provided a first slide assembly (1) on the right side and a second slide assembly (2) on the left side, as known in the art.

As illustrated, the long lower rail (20R or 20L) is of generally "U" shape in cross-section having a bottom wall (20a) in which there are formed a plurality of lock holes (30) associated with a corresponding locking mechanism (22R or 22L) to be described later. On the other hand, the upper rail (18R or 18L) is of generally "inverted T" shape in cross-section comprising a vertical upper portion (18Ra or 18La) and a horizontally extending lower guide portion (18Rb or 18Lb). As shown, the lower guide portion (18Rb or 18Lb) of upper rail (18R or 18L) is slidbaly inserted in the long lower rail (20R or 20L), while the vertical upper portion (18Ra or 18La) thereof extends upwardly from the long lower rail (20R or 20L). Fixedly connected to the vertical upper portion (18Ra or 18La) is a seat riser member (26) on which a seat (S) is mounted as indicated by the one-dot chain lines in FIG. 2.

A pair of forward and backward rollers (24f) (24b) are provided rotatably to the respective forward and backward end portions of the upper rail (18R or 18L) to allow the upper rail (18R or 18L) to be movable along the long lower rail (20R or 20L). As best seen in FIG. 5, each roller (24f or 24b) is rotatably supported by a shaft (48) fixed to the lower end portion of the upper rail (18R or 18L).

The first and second long lower rails (20R) (20L) are firmly secured at their respective forward and backward ends upon the vehicle floor (12) by means of forward and backward leg members (43) (45) which are fixedly fastened to the floor (12). As shown, a pair of the forward leg members (43) (43) are each formed with a foremost securing lug (44), while a pair of the backward leg members (45) (45) are each formed with a rearmost securing lug (46). Those securing lugs (44) (46) are adapted for securing the free ends of flexible drive transmission means (16 and 52) to the floor (12) as will be specified later.

Figure 3:
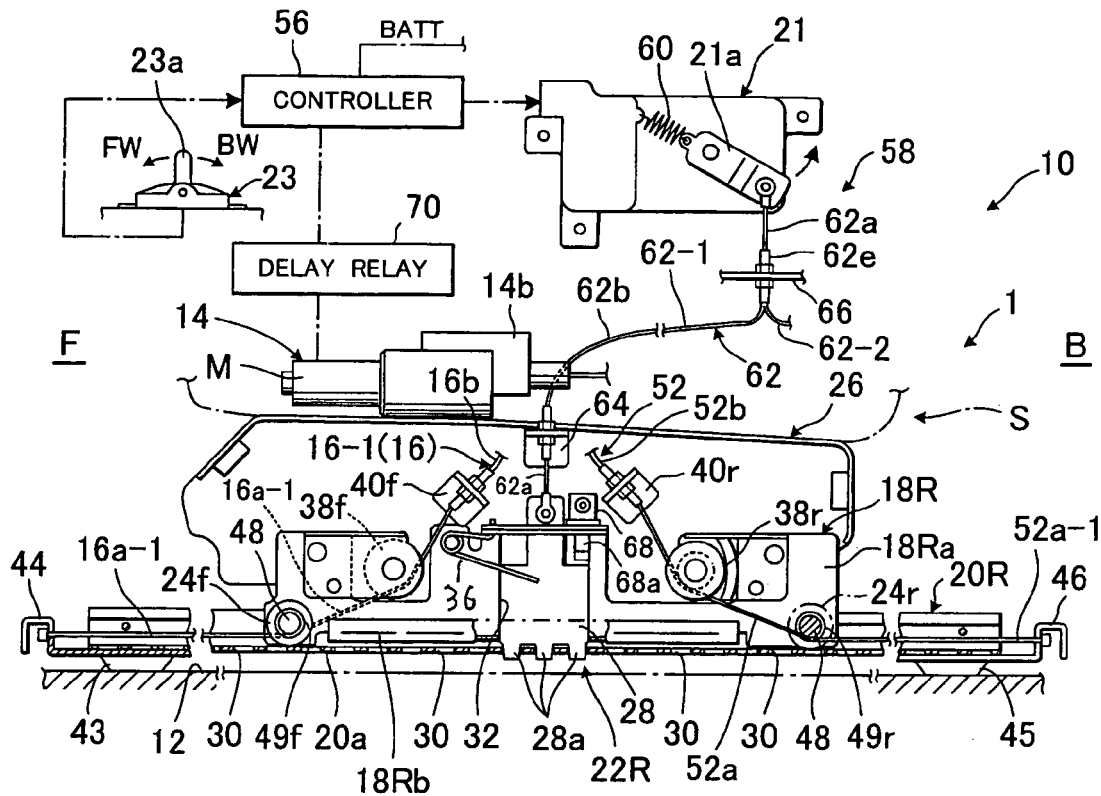
FIG. 3 is a partly broken schematic elevational side view showing some principal parts and lock mechanism of the first mode of FIG. 1, inclusive of a block chart which explanatorily shows an electrical connection and instruction flow among the principal parts and lock mechanism.
Figure 4:
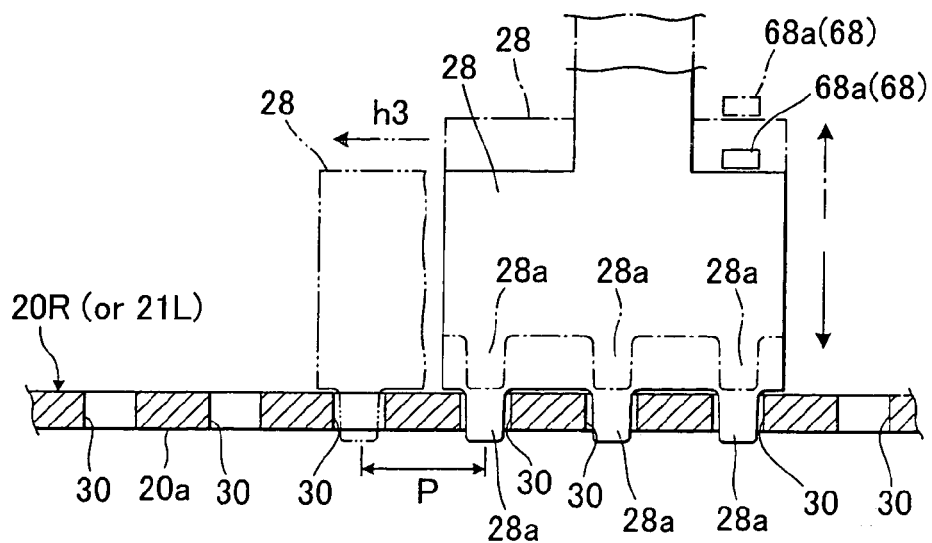
FIG. 4 is a diagram for explanatorily showing an operational relation between a latch plate and a plurality of lock holes.

As in FIG. 1, a pair of first and second latch-type locking mechanisms (22R) (22L) are provided in the first and upper rails (18R) (18L), respectively, so as to permit for locking and unlocking the two upper rails (18R) (18L) to and from the respective two lower rails (20R) (20L). A typical example of this latch-type locking mechanism is known from the Japanese Laid-Open Patent Publication No. 1-301315. Since this is well known in the art and the first and second locking mechanisms (22R) (22L) are identical in structure to each other, a brief description will be made only of the first locking mechanism (22R). As best seen in FIGS. 3 and 4, the first locking mechanism (22R) comprises a plurality of lock holes (30) and a latch plate (28) having a three lock pieces (28a). The lock holes (30) are formed in the bottom wall (20a) of the long lower rail (20R) in the longitudinal direction thereof, and the latch plate (28) is movably fitted in a vertically cut-away area (32) formed in the upper vertical portion (18Ra) of upper rail (18R) so that the latch plate (28) is vertically movable to and from the lock holes (30). That is, the three lock pieces (28a) of the lock plate (28) can be lowered for insertion into the corresponding three of the lock holes (30), thereby locking the upper rail (18R or 18L) to a desired point on the lower rail (20R or 20L).

In accordance with the slide rail device (10) of the present invention, generically stated, provided in the above-described known long slide assemblies (1, 2) are: a drive unit (14) having an electric motor (M) incorporated therein; a flexible main drive transmission means (16) for transmitting normal and reverse rotation (i.e. drive force) of the motor (M) to both first and second upper rails (18R) (18L); and a lock operation/control means (58) for causing vertical engagement and disengagement of the latch plate (28) to and from the lock holes (30) and controlling an operative relation between the motor (M) of drive unit (14) and the locking/unlocking action of the first and second latch-type locking mechanisms (22R) (22L) in conjunction with operation of the drive unit (14) and flexible main drive transmission means (16).

The drive unit (14) is of a geared motor type comprising the motor (M), a gear box portion (14a), and a rotary reel portion (14b) in which a normal winding reel and a reverse winding reel are rotatably provided, though not shown. This type of drive unit is known in the art and therefore any further description is omitted thereon. In brief, normal and reverse operation of the motor (M) causes simultaneous rotation of both of those two reels for actuating the flexible main drive transmission means (16) as will be described later.

FIGS. 1 to 5 show a first exemplary embodiment of the slide rail device (10). According thereto, the flexible main drive transmission means (16) is so arranged as to extend from the opposite sides of the drive unit (14) toward both first and second slide assemblies (1) (2). In the present embodiment, the flexible main drive transmission means (16) is basically embodied by: a flexible wire cable element (16); a forward first pulley (38f); a backward first pulley (38r); a forward second pulley (49f); and a backward second pulley (49r).

Generically, the flexible wire cable element (16) is formed by: an outer tube (16b) of a flexible property; and a wire cable (16a), a part of which is slidably inserted in the outer tube (16b), so that the former (16a) is movable forwardly and backwardly relative to the latter (16b).

As illustrated, the flexible main drive transmission means (16) comprises a first flexible wire cable element (16-1) and a second flexible wire cable element (16-2). More specifically, formation of the first flexible wire cable element (16-1) is such that a part of first flexible wire cable (16a-1) thereof is slidably inserted in an outer tube (16b-1) of a flexible property. Likewise, formation of the second flexible wire cable (16-2) is such that a part of the second wire cable (16a-2) thereof is slidably inserted in an outer tube (16b-2) of a flexible property.

As seen in FIG. 1, briefly stated, the first flexible wire cable element (16-1) is disposed between the drive unit (14) and the first upper rail (18R), while on the other hand, the second flexible wire cable element (16-2) is disposed between the drive unit (14) and the second upper rail (18L).

Figure 2:
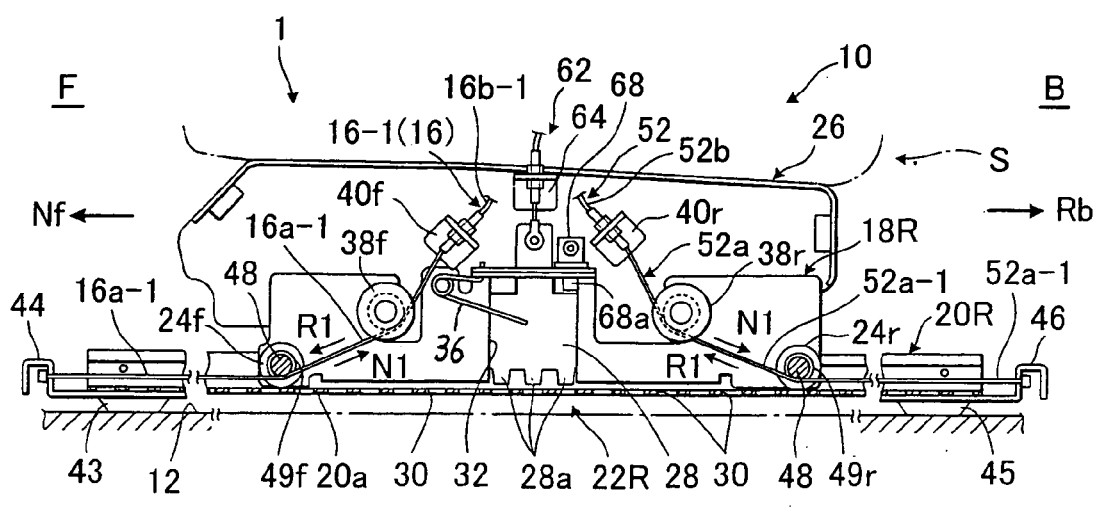
FIG. 2 is a partly broken schematic elevational side view showing some principal parts and lock mechanism of the first mode shown in FIG. 1, which is intended to explanatorily show actions thereof.

Reference is now made to FIGS. 2 and 3 which show, in elevation, a right-side principal part of the present invention, which is associated with the first slide assembly (1). But, it should be understood that the not-shown left-side principal constituent parts of the second slide assembly (2) is basically identical in structure and mechanisms to the illustrated principal parts of the first slide assembly (1), excepting some portions to be set forth below. This can also be seen from FIG. 5 which shows, in plan, the right-side first slide assembly (1) and the left-side second slide assembly (2).

As best seen in FIGS. 3 and 5, with regard to both first and second slide assemblies (1) (2) in common, the forward second pulley (49f) is rotatably attached about the shaft (48) of the forward roller (24f) and thus disposed at the forward end of the upper rail upper vertical portion (18Ra), whereas the backward second pulley (49r) is rotatably attached about the shaft (48) of the backward roller (24r), thus being disposed at the backward end of the upper vertical portion (18Ra).

But, as can be seen from FIG. 5, with regard to the first slide assembly (1), the forward and backward first pulleys (38f) (38r) are rotatably connected with the respective forward and backward regions of the upper rail (18R) in such a manner that the forward first pulley (38f) is disposed forwardly of and on the right side of the upper rail vertical upper portion (18Ra), while the backward first pulley (38r) is disposed backwardly of and on the left side of that particular vertical upper portion (18Ra). And, likewise constructed is the second slide assembly (2), only except that the forward first pulley (38f) is disposed on the left side of the upper rail vertical upper portion (18Ra), while the backward first pulley (38r) is disposed on the right side of that particular vertical upper portion (18Ra).

As for both first and second slide assemblies (1) (2) in common, it is seen that the forward first pulley (38f) is situated at a point backwardly of and above the forward second pulley (49f), and the backward first pulley (38r) is situated at a point forwardly of and above the backward second pulley (49r). Designation (40f) denotes a forward securing bracket to which one end of the outer tube (16b-1) of first flexible wire cable element (16-1) is firmly secured. Likewise, designation (40r) denotes a backward securing bracket to which one end of the outer tube (16b-2) of first flexible wire cable element (16-2) is firmly secured. It is observed in FIG. 3 that the forward securing bracket (40f) is fixed to the inward wall of the seat riser member (26) at a point adjacent to and above the afore-said forward first pulley (38f), while on the other hand, the backward securing bracket (40r) is fixed to the inward wall of the seat riser member (26) at a point adjacent to and above the afore-said backward first pulley (38r).

With the foregoing arrangement, as understandable from FIGS. 1 to 5, the first flexible wire cable element (16-1) is disposed between the forward securing bracket (40f) of the first slide assembly (1) and the drive unit (14), while by contrast, the second flexible wire cable element (16-2) is disposed between the backward securing bracket (40r) of the second slide assembly (2) and the drive unit (14).

Accordingly, as seen in FIGS. 1 and 3, the exposed portion of the first wire cable (16a-1) of the first flexible wire cable element (16-1) is extended, with a tension given thereto, between the forward securing bracket (40f) and the foremost securing lug (44) of the first lower rail (20R), while being in a partial contact with the forward first pulley (38f) and the forward second pulley (49f), as best seen in FIG. 3. On the other hand, as can be seen in FIGS. 1 and 5, the exposed portion of the second wire cable (16a-2) of the second flexible wire cable element (16-2) is extended, with a tension given thereto, between the backward securing bracket (40b) and the rearmost securing lug (46) of the second lower rail (20L), while being in a partial contact with the backward first pulley (38r) and the backward second pulley (49r), Needless to state, a whole wire cable element (16) is arranged on the seat riser member (26), and thus above the floor (12), so that there is a space between the seat (S) and floor (12), which advantageously allows for reducing the height of the seat (S) and also for installation of other elements under the seat (S) and on the floor (12).

With the above-described arrangement, reference being made to FIG. 2, upon normal operation of the motor (M), the rotary reel portion (14b) is operated in normal direction, as indicated by the arrow (N). In other words, though not shown, in such rotary reel section (14b), one reel is rotated to wind up the first wire cable (16a-1), which is indicated by the normal arrow direction (N), thereby causing withdrawal of that particular wire cable (16a-1) in the arrow direction (N1) into the rotary reel portion (14b), while at the same time, another reel is rotated in a direction opposite to the normal rotation of the afore-said one reel so as to feed the second wire cable (16a-2) out of the rotary reel section (14b), thereby extending that particular second wire cable (16a-2) outwardly in the arrow direction (N1). Thus, a synchronized relative withdrawing (or winding) and extending (or unwinding) motion is effected between the first and second wire cables (16a-1) (16a-2). This is however a known reel-type wire feed mechanism used in the present invention by way of example, and therefore, no further specific description is made thereof.

Upon normal winding operation of the drive unit (14) in the direction (N), the first wire cable (16a-1) is withdrawn into the drive unit (14), which in turn draws a whole of the exposed portion of the first wire cable (16a-1) which is partially contacted with the forward first and second pulleys (38f) (49f). Simultaneous therewith, the second wire cable (16a-2) is unwound and extended from the drive unit (14) to the second upper rail (18L), thus allowing forward extension of the exposed portion thereof which is partially contacted with the backward first and second pulleys (38r) (49r), along the second long lower rail (20L). Consequently, a forward drive force is applied from the thus-drawn exposed portion of first wire cable (16a-1) to both of the two pulleys (38f) (49f), thereby giving a forward thrust force to the first upper rail (18R), while at the same time, the unwinding forward extension of the exposed portion of second wire cable (16a-2) along the second long lower rail (20L) gives an additional forward thrust force to the second upper rail (18L) through the associated two pulleys (38r) (49r) which are being rotated clockwise by the unwinding or forwardly extending exposed portion of second wire cable (16a-2), thereby allowing smooth forward displacement of the second upper rail (18L) along the second long lower rail (20L).

It is therefore appreciated that the first and second upper rails (18R) (18L) are moved forwardly on and along the respective first and second long lower rails (20R) (20L), without interference of the second wire cable (16a-2) with the first wire cable (16a-1), so that the seat riser member (26) or seat (S) is smoothly moved in the forward arrow direction (Nf) along the two lower rails (20R) (20L).

By contrast, upon reverse operation of the motor (M), the rotary reel portion (14b) is operated in a reverse direction as indicated by the arrow (R). In other words, though not shown, in the rotary reel portion (14b), the foregoing another reel is then rotated to wind up the second wire cable (16a-2), which is indicated by the reverse arrow direction (R1), thereby causing withdrawal of that particular wire cable (16a-2) into the rotary reel portion (14b) in the arrow direction (R1), while at the same time, the foregoing one reel is rotated in a direction opposite to the reverse rotation of the said another reel, thereby causing advance of that particular first wire cable (16a-1) in the arrow direction (R1) from the rotary reel portion (14b). Under such synchronized relative withdrawing and extending motions between the first and second wire cables (16a-1) (16a-2), the second wire cable (16a-2) is withdrawn into the drive unit (14), which in turn draws a whole of the exposed portion of the second wire cable (16a-2) which is partially contacted about the backward first and second pulleys (38r) (49r) associated with the second upper rail (18R). Simultaneous therewith, the first wire cable (16a-1) is extended from the drive unit (14) to the first upper rail (18R), thus allowing backward extension of the exposed portion thereof which are partially contacted with the forward first and second pulleys (38f) (38f), along the first long lower rail (20R). Consequently, a backward drive force is applied from the thus-drawn exposed portion of second wire cable (16a-2) to both of the two pulleys (38r) (49r), thereby giving a backward thrust force to the second upper rail (18L), while at the same time, the foregoing backward extension of the exposed portion of first wire cable (16a-1) along the first long lower rail (20R) gives a certain additional forward thrust force to the first upper rail (18R) through the associated two pulleys (38f) (49f) which are being rotated clockwise by the unwinding or backwardly extending exposed portion of first wire cable (16a-1), thereby allowing smooth forward displacement of the first upper rail (18R) along the second long lower rail (20R). Thus, the seat riser member (26) or seat (S) is smoothly moved in the backward arrow direction (Rb) along the two lower rails (20R) (20L).

Designation (52) denotes an auxiliary flexible follower wire element which is operatively connected between the first upper rail (18R) and the second upper rail (18L), in such a manner to cross the flexible main drive transmission means (16), as seen in FIG. 1. The auxiliary flexible follower wire element (52) may preferably be provided in the slide rail device (10) to make smooth the above-described forward and backward movement of the first and second main flexible wire elements (16-1) (16-2).

This auxiliary flexible follower wire element (52) is shown to comprise an outer tube (52b) and a follower wire cable (52a), such that a part of the follower wire cable (52a) is slidably inserted in and through the outer tube (52b). As understandable from FIGS. 2 and 5, one end of the outer tube (52b) is fixedly connected with a backward securing bracket (40r) fixed to the upper rail upward vertical portion (18Ra), whereas another end of the outer tube (52b) is fixedly connected with a forward securing bracket (40f).

Specifically, as can be seen in FIGS. 1, 3 and 5, one exposed portion (52a-1) of the wire cable (52a), which extends outwardly from the foregoing one end of outer tube (52b), is extended with a tension given thereto and partly contacted about both backward first and second pulleys (38r) (49r) associated with the first upper rail (18R), while on the other hand, likewise, another exposed portion (52a-2) of the wire cable (52a), which extends outwardly from the foregoing another end of outer tube (52b), is also extended with a tension given thereto and partly contacted about both forward first and second pulleys (38f) (49f) associated with the second upper rail (18L). Further, the afore-said one exposed portion (52a-1) of wire cable (52a) extends backwardly in and along the first lower rail (20R) and is connected with the backward securing lug (46), while the afore-said another exposed portion (52a-2) of wire cable (52a) extends forwardly in and along the second lower rail (20L) and is connected with the backward securing lug (44).

With the addition of the auxiliary flexible follower wire cable element (52), upon normal winding operation of the drive unit (14) in the direction (N), the first wire cable (16a-1) is withdrawn into the drive unit (14) as described above, thereby imparting a driving force through the first wire cable (16a-1) to the first upper rail (18R) which is therefore moved forwardly as indicated by the arrow (Nf), but, simultaneous therewith, the wire cable (52a) of the auxiliary flexible follower wire element (52) is moved through the outer tube (52b) in the normal arrow direction (N1) as in FIG. 1. Hence, it is to be seen that the foregoing one wire cable exposed portion (52a-1) is increasingly extended along the first lower rail (20R), while the foregoing another wire cable exposed portion (52a-2) reduces its length accordingly along the second lower rail (20L). Conversely, reverse operation of the drive unit (14) in the direction (R) causes withdrawal of the second wire cable (16a-2) into the drive unit (14), as described above, thus imparting a driving force through the second wire cable (16a-2) to the second upper rail (18L) which is therefore moved backwardly as indicated by the arrow (Rb), but, simultaneous therewith, the wire cable (52a) of the auxiliary follower wire element (52) is moved through the outer tube (52b) in the reverse arrow direction (R1) as in FIG. 1. Hence, the foregoing another wire cable exposed portion (52a-2) is increasingly extended along the second lower rail (20L), while the foregoing one wire cable exposed portion (52a-1) reduces its length accordingly along the first long lower rail (20R). In other words, an equalized relative movement is effected between those two wire cable exposed portions (52a-1) (52a-2) through the outer tube (52b), which surely realizes a complete uniform transmission of both normal and reverse drive forces between the first and second upper rails (18R) (18L).

Accordingly, it is appreciated that, even when a structural deformation or error occurs in shape of the automobile body and in the floor of automobile to cause deformation and twisting of the long lower rails (20R, 20L), all the main flexible wire cable element (16) and auxiliary follower wire cable element (52) are resiliently flexible and left in a loosened state on seat riser member (26). Hence, the wire cable elements (16 and 52) themselves are not subjected to any damage and trouble by the deformation and twisting of long lower rails (20R, 20L), thereby insuring a smooth transmission therethrough of a drive force from the drive unit (14) to both two upper rails (18R, 18L).

Further, only the exposed wire cable portions (16a-1, 16a-2, 52a-1 and 52a-2) are rectilinearly extended between the corresponding second pulleys (49f or 49b) and the corresponding forward or backward lugs (44 or 46) of lower rails (20R or 20L). For that purpose, the illustrated disposition of the paired first and second pulleys (38f and 49f) or (38r and 49r) is preferable to naturally give a tension to a particular region of each exposed wire cable portion (16a-1, 16a-2, 52a-1 or 52a-2) that extends rectilinearly between the pulleys (49f, 49r) and the lower rail forward and backward lugs (44 or 46). That is, as seen in FIGS. 2 and 3, the forward or backward first pulley (38f or 38r) is located at a point slightly below a rectilinear line extending through the forward or backward second pulley (49f or 49r), whereby the exposed wire cable portion (16a-1, 16a-2, 52a-1 or 52a-2) is forcibly stretched, with a certain tension given thereto, by that pulley (38f or 38r).

With such properly loosened and tensioned wire cable arrangement, the normal and reverse drive forces of the drive unit (14) are smoothly transmitted to both two upper rails (18R, 18L). In this connection, the exposed wire cable portions (16a-1, 16a-2, 52a-1 and 52a-2) extend generally centrally of the long lower rail (20R or 20L), thus advantageously keeping the wire cable out of contact with inner walls of the lower rail (20R or 20L) which is bent and deformed due to an upward great force applied thereto via a seat belt (not shown) and upper rails (18R, 18L).

Therefore, a whole of the drive transmission between the drive unit (14) and the two upper rails (18R, 18L) are protected against any damage and trouble due to the aforementioned deformation and twisting of lower rails (20R, 20L) in contrast to the prior-art sidle rail device based on a long lead screw element and a rotary nut element.

In accordance with the present invention, as stated earlier, the lock operation/control means (58) is provided for controlling an operative relation between the motor (M) of drive unit (14) and the locking/unlocking action of the first and second latch-type locking mechanisms (22R) (22L). That is, in order for the three lock pieces (28a) of latch plate (28) to be completely disengaged from and precisely engaged into the respective selected three of the lock holes (30) formed in each of the two lower rails (20R) (20L), the lock control operation/control means (58) is importantly provided between the latch plate (28) and a lock operation means (58A) to be described below.

Referring to FIG. 3, one preferred mode of such lock operation/control means (58) is shown as comprising: a start switch element (23); an electronic controller (56); a delay relay (70); an electrically operated actuator (21) and a lock detection element (78).

The start switch element (23) is electrically connected with the controller (56) to which is connected a battery (BATT) as a power source. The controller (56) is electrically connected with the actuator (21) which is operable to cause locking and unlocking of the lock plate (28) to and from the lower rail (20R or 20L).

Specifically, the actuator (21) has a rotary actuator piece (21a) which is normally biased to a home position under the biasing force of a spring (60), as shown in FIG. 3. In this regard, a bifurcated wire cable element (62) is operatively connected between a free end of such rotary actuator piece (21a) and the first and second upper rails (18R) (18L). The bifurcated wire cable element (62) has one end portion (62e) and a pair of first and second wire cable portions (62-1) (62-2) bifurcated from that one end portion (62e). Those one end portion (62e) and first and second wire cable portions (62-1) (62-2) are each formed by an outer tube (62b) and an inner wire cable (62a) slidably inserted in and along the outer tube (62b). As shown, such one end portion (62e) is fixedly fastened to a securing member (66), while the first and second wire cable portions (62-1) (62-2) bifurcated from that one end portion (62e) are extended to the first and second upper rails (18R) (18L), respectively.

As shown, the delay relay (70) is electrically connected between the controller (56) and the motor (M) of the drive unit (14). The lock detection element (78) is adapted to detect the locking and unlocking state of the latch plate (28) with respect to the lower rail (20R or 20L), and electrically connected with the controller (56).

For the sake of simplicity in description, a specific elaboration will be made only with regard to the first slide assembly (1).

The start switch element (23) is of an automatically returnable two-way switching type where a switch knob (23a) thereof may be turned over to one of forward and reverse switch-on directions (FW) (BW) and automatically returnable to the neutral switch-off position shown by the solid line. This start switch element (23) is electrically connected with the controller (56) for transmitting normal or reverse drive instruction signal to the motor (M) and also electrically connected with the actuator (21) for unlocking operation of that particular actuator (21). That is, in brief, when the switch knob (23a) is turned over to the normal direction (FW), the actuator (21) is driven to cause disengagement of the latch plate (28) from the lock holes (30), while simultaneously, the drive unit (14) is operated in the normal direction (N) after lapse of a certain delay time for movement of the seat (S) in the forward direction (Nf). On the other hand, turning the switch knob (23a) over to the reverse direction (BW) results in the actuator (21) being driven to cause disengagement of the latch plate (28) from the lock holes (30), while simultaneously, the drive unit (14) is operated in the reverse direction (R) after lapse of a certain delay time for movement of the seat (S) in the forward direction (Rb). The start switch element (23) may be mounted on a lateral wall of a seat cushion of the seat (S) or other suitable location of the seat (S).

When the switch knob (23a) is turned over to the normal direction (FW), a signal is sent to the controller (56) which in turn sends a normal instruction signal to the actuator (21). Then, the rotary actuator piece (21a) is rotated anticlockwise as indicated by the arrow from the shown home position, as in FIG. 3, thereby drawing the inner wire cable (62a) upwardly, with the result that the latch plate (28) is raised accordingly against a biasing force of the spring (60), with the three lock pieces (28a) thereof being disengaged from the three lock holes (30). Simultaneous therewith, the upward movement of the latch plate (28) raises the slide switch (68a) to an "on" direction. Then, upon complete disengagement of the three lock pieces (28a) from the respective three lock holes (30), the slide switch (68a) is turned "on", sending a signal to the controller (56) for instruction to cause normal operation of the drive unit (14). The controller (56) determines the unlocked state of the upper rail (20R) and gives an "on" signal to start normal operation of the motor (M) via the delay relay (70), whereupon the rotary reel portion (14b) is operated as indicated by the arrow (N) to cause the upper rails (18R, 18L) or the seat (S) to move in the forward direction (Nf) via the first and second flexible wire elements (16-1) (16-2) and the auxiliary follower wire element (52) as describe previously. In this regard, it is arranged such that the delay relay (70) does not work in this particular case where the "on" signal is inputted thereto from the controller (56), allowing that "on" signal to be transmitted directly to the motor (M).

Under such state, by retaining the switch knob (23a) to the normal switch-on side (FW), the drive unit (14) continues to operate in the normal direction (N), thereby keeping on movement of the seat (S) in the forward direction (Nf).

At this stage, when it is desired to lock the seat (S) or the upper rails (18R, 18L) to a certain position, a seat occupant should let the switch knob (23a) returned to the neutral switch-off position, at which time, a switch-off signal is sent therefrom to the controller (56). Responsive to the switch-off signal, the controller (56) sends an "off" signal to the actuator (21) which stops its operation to release the rotary actuator piece (21a) from the upward locked state, whereupon the rotary actuator piece (21a) is rotated clockwise and returned to the home position under the biasing force of spring (60), which in turn allows downward movement of the latch plate (28) via the wire cable element (62) toward lock holes (30). Simultaneous therewith, the slide switch (68a) is moved donwardly. In this regard, when the lock pieces (28a) of latch plate (28) are completely engaged in the lock holes (30), the slide switch (68a) detects it and the lock detection element (68) sends a lock-on signal to the controller (56). Then, the controller (56) outputs an "off" signal to the delay relay (70). Only on this occasion, the delay relay (70) works to delay its switch-on action for a predetermined period of time, so that a certain delay time is given before switching on the relay action. Therefore, after lapse of such delay time, an "off" signal is outputted from the delay relay (70) to the motor (M) for stopping its drive operation, thereby ceasing normal operation of the rotary reel portion (14b) and all the wire cable elements (16 and 52). It is noted here that, as can be seen in FIG. 4, the delay time is preferably set in the delay relay (70) on the basis of a time (h3) required for the latch plate (28) to move at one pitch (P) between one lock hole (30) and another adjacent lock hole (30). Accordingly, it is to be appreciated that, when returning the switch knob (23a) to the neutral switch-off position, the lock plate (28), lowered to a level corresponding to the bottom wall (20a) of lower rail (20R or 20L), is being still moved forwardly at the afore-said one pitch (P), in order to insure that the three lock pieces (28a) of lock plate (28) are engaged into the respective three lock holes (30) in conjunction with the slide switch (68a) which detects a complete engagement of those lock pieces (28a) in the respective lock holes (30).

Of course, the same delay process as described above is effected for the case where the switch knob (23a) is turned over to the reverse direction (BW). Further description thereon is omitted for the sake of simplicity in view of the previous brief description concerning the start switch element (23).

While not shown, the controller (77) includes a microcomputer (CPU or the like) and the associated electric control elements, which are properly arranged so as to process and control the above-described lock control steps.

Figure 6:
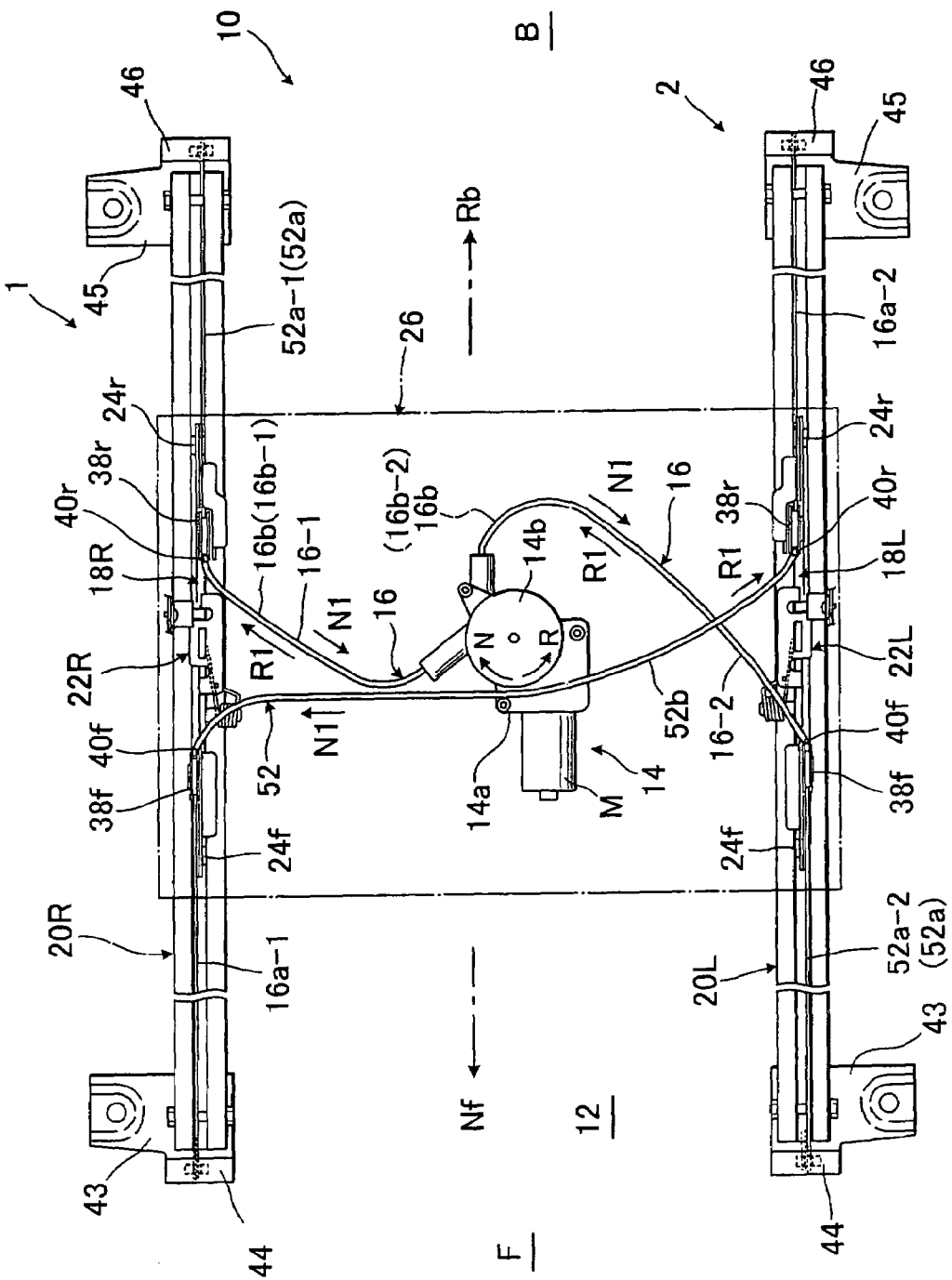
FIG. 6 is a partly broken schematic plan view showing an alternative second mode of the seat slide device.
Figure 7:
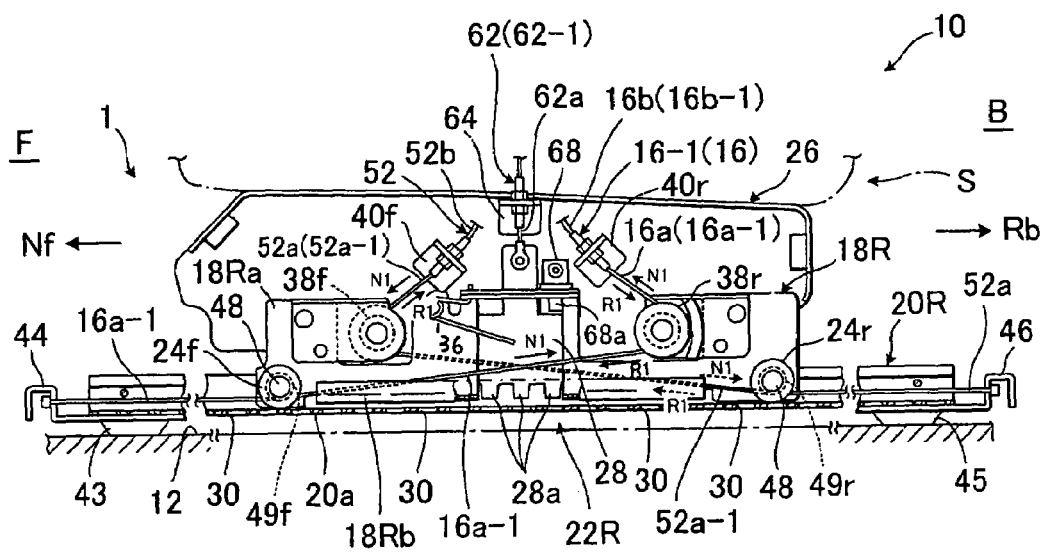
FIG. 7 is a partly broken schematic elevational side view showing some principal parts and lock mechanism provided on a right-side portion of the second mode of FIG. 6, which is intended to explanatorily show actions thereof.
Figure 8:
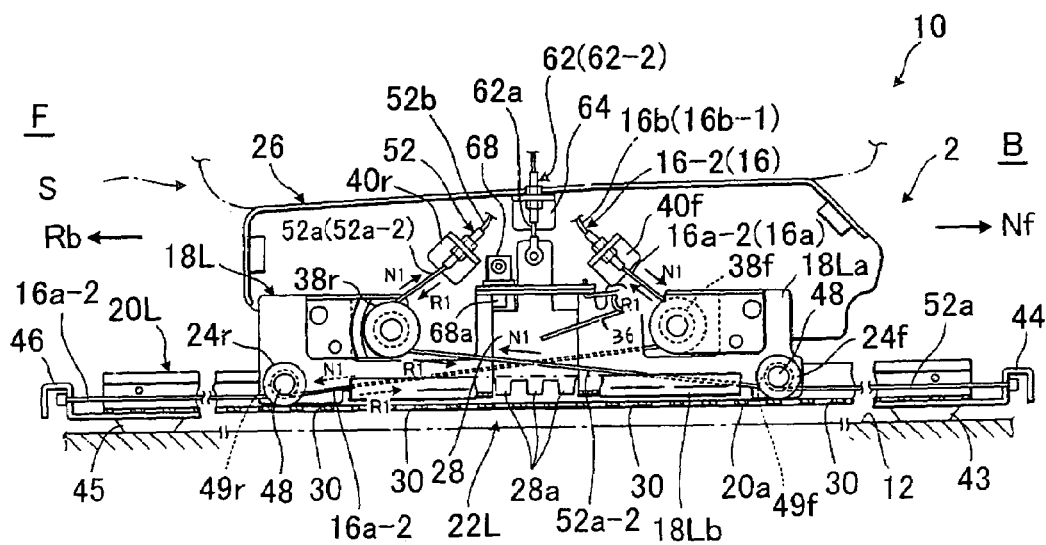
FIG. 8 is a partly broken schematic elevational side view showing some principal parts and lock mechanism provided on a left-side portion of the second mode of FIG. 6, which is intended to explanatorily show actions thereof.

FIGS. 6 to 8 show an alternative second mode of the slide rail device (10) which is basically identical to the foregoing first mode in structure and associated lock and drive mechanisms, only with a difference between the first and second embodiments residing in a reversed wire cable arrangement for the first and second wire cable elements (16-1) (16-2) and auxiliary wire cable element (52), as opposed to the wire cable arrangement in the first mode. Therefore, all like designations to be given hereinafter correspond to all like designations that have been used in the first embodiment described previously, and any further description is omitted for the common parts and mechanisms between the first and second embodiments for the sake of simplicity.

According to the present second embodiment, as similar to the first mode, there are provided a first flexible wire cable element (16-1) and a second flexible wire cable element (16-2). However, in contrast to the first mode, the first flexible wire cable element (16-1) is disposed between the backward securing bracket (40r) of the first slide assembly (1) and the drive unit (14), while the second flexible wire cable element (16-2) disposed between the forward securing bracket (40f) of the second slide assembly (2) and the drive unit (14).

As best seen in FIG. 7, the exposed portion of the first wire cable (16a-1) of the first flexible wire cable element (16-1) is extended, with a tension given thereto, between the backward securing bracket (40r) and the foremost securing lug (44) of the first lower rail (20R), while being in a partial contact about a backward first pulley (38r) and the forward second pulley (49f). On the other hand, as best seen in FIG. 8, the exposed portion of the second wire cable (16a-2) of the second flexible wire cable element (16-2) is extended, with a tension given thereto, between the forward securing bracket (40f) and the rearmost securing lug (46) of the second lower rail (20L), while being in a partial contact about the forward first pulley (38f) and the backward second pulley (49r), Of course, a whole wire cable element (16) is arranged on the seat riser member (26) as well as on the first and second slide assemblies (1) (2), and thus located above the floor (12), so that there is a space between the seat (S) and floor (12) and the same advantages as described in the first embodiment are attained.

Accordingly, with the present second mode of arrangement, referring now to FIG. 6, upon normal operation of the motor (M), the rotary reel portion (14b) is operated in normal direction, as indicated by the arrow (N). That is, though not shown, in such rotary reel section (14b), one reel is rotated to wind up the first wire cable (16a-1), thereby causing withdrawal of that particular wire cable (16a-1) in the arrow direction (N1) into the rotary reel portion (14b), while at the same time, another reel is rotated in a direction opposite to the normal rotation of the afore-said one reel so as to feed the second wire cable (16a-2) out of the rotary reel portion (14b), thereby extending that particular second wire cable (16a-2) outwardly in the arrow direction (N1). Thus, a synchronized relative withdrawing and extending motion is effected between the first and second wire cables (16a-1) (16a-2).

In practice, when the switch knob (23a) is turned over to the normal direction (FW), the drive unit (14) effects normal winding operation in the direction (N), while simultaneously, the actuator (21) operates to cause disengagement of the three lock pieces (28a) of latch plate (28) from the three lock holes (30).

Then, the first wire cable (16a-1) is withdrawn (i.e. wound) into the drive unit (14), thereby drawing a whole of the exposed portion of the first wire cable (16a-1), as indicated by the arrow (N1), wherein that first wire cable exposed portion is partially contacted about the backward first pulley (38r) and forward second pulley (49f) which are associated with the first upper rail (18R). Simultaneously therewith, as indicated by the arrow (N1), the second wire cable (16a-2) is extended (i.e. unwound) from the drive unit (14) in a direction to the forward first pulley (38f) and forward second pulley (49r) which are associated with the second upper rail (18L). Consequently, it is seen that, as viewed from FIGS. 6 and 7, such withdrawal of the first wire cable (16a-1) into the drive unit (14) as indicated by the arrow (N1) causes anticlockwise rotation of the backward first pulley (38r) of the first upper rail (18R), while applying a forward drive force thereto, whereas on the other hand, as viewed from FIGS. 6 and 8, the extension of the second wire cable (16a-2) from the drive unit (14) as indicated by the arrow (N1) causes clockwise rotation of the forward first pulley (38f) of the second upper rail (18L), thereby applying an additional forward force thereto. Hence, a forward drive force is applied from the exposed portions of first and second wire cables (16a-1) (16a-2) intensively to the backward and forward first pulleys (38r) (38f) respectively of the first and second upper rails (18R) (18L), thereby giving a forward thrust force to both first and second upper rails (18R) (18L). It is therefore appreciated that both first and second upper rails (18R) (18L) are moved forwardly on and along the respective first and second long lower rails (20R) (20L), without interference of the second wire cable (16a-2) with the first wire cable (16a-1), so that the seat riser member (26) or seat (S) is smoothly moved in the forward arrow direction (Nf) along the two lower rails (20R) (20L).

Conversely, when the switch knob (23a) is turned over to the reverse direction (BW), the drive unit (14) effects reverse winding operation in the direction (R), while simultaneously, the actuator (21) operates to cause disengagement of the three lock pieces (28a) of latch plate (28) from the respective three of the lock holes (30).

Then, the second wire cable (16a-2) is withdrawn into the drive unit (14), thereby drawing a whole of the exposed portion of the second wire cable (16a-2), as indicated by the arrow (R1), wherein that second wire cable exposed portion is partially contacted about the forward first pulley (38f) and backward second pulley (49r) which are associated with the second upper rail (18L). Simultaneously therewith, as indicated by the arrow (R1), the first wire cable (16a-1) is extended from the drive unit (14) in a direction to the backward first pulley (38r) and forward second pulley (49f) which are associated with the first upper rail (18R). Consequently, it is seen that, as viewed from FIGS. 6 and 8, such withdrawal of the second wire cable (16a-2) into the drive unit (14) as indicated by the arrow (R1) causes anticlockwise rotation of the forward first pulley (38f) of the second upper rail (18L), while applying a backward force thereto, whereas on the other hand, as viewed from FIGS. 6 and 7, the extension of the first wire cable (16a-1) from the drive unit (14) as indicated by the arrow (R1) causes clockwise rotation of the backward first pulley (38r) of the first upper rail (18R), thereby applying an additional backward force thereto. Hence, a backward drive force is applied from the exposed portions of first and second wire cables (16a-1) (16a-2) intensively to both forward and backward first pulleys (38f) (38r) respectively of the first and second upper rails (18R) (18L), thereby giving a backward thrust force to both first and second upper rails (18R) (18L). Accordingly, both first and second upper rails (18R) (18L) are moved backwardly on and along the respective first and second long lower rails (20R) (20L), without interference of the second wire cable (16a-2) with the first wire cable (16a-1), so that the seat riser member (26) or seat (S) is smoothly moved in the backward arrow direction (Rb) along the two lower rails (20R) (20L).

In the present embodiment, as shown in FIG. 6, the auxiliary flexible follower wire element (52) is operatively connected between the first upper rail (18R) and the second upper rail (18L) in such a manner to cross the flexible main drive transmission means (16).

As can be seen in FIGS. 6, to 8, in contrast to the first embodiment, one end of the outer tube (52b) of the auxiliary flexible follower wire element (52) is fixed to the forward securing bracket (40f) of the first upper rail (18R), such that one exposed portion (52a-1) of the wire cable (52a) is extended with a tension given thereto and partly contacted about forward first pulley (38f) and backward second pulley (49r). On the other hand, another end of the outer tube (52b) of the auxiliary flexible follower wire element (52) is fixed to the backward securing bracket (40f) of the second upper rail (18L), such that another exposed portion (52a-2) of the wire cable (52a) is extended with a tension given thereto and partly contacted about backward first pulley (38r) and forward second pulley (49f). Further, the afore-said one exposed portion (52a-1) of wire cable (52a) extends backwardly in and along the first lower rail (20R) and is connected with the rearmost end (46) of that first lower rail (20R), while the afore-said another exposed portion (52a-2) of wire cable (52a) extends forwardly in and along the second lower rail (20L) and is connected with the foremost end (44) of that second lower rail (20L).

With the addition of the auxiliary follower wire cable element (52), likewise as explained in the first embodiment, an equalized relative movement is effected between those two wire cable exposed portions (52a-1) (52a-2) through the outer tube (52b) in synchronism with the normal and reverse movements of the first and second wire cable (16a-1) (16a-2), which surely realizes a complete uniform transmission of both normal and reverse drive forces between the first and second upper rails (18R) (18L). In the present embodiment, as any person skill in the art will understand, upon normal winding operation of the drive unit (14) in the direction (N), the wire cable (52a) of the auxiliary follower wire element (52) is moved through the outer tube (52b) in the normal arrow direction (N1) as in FIG. 6, and it is therefore seen that the foregoing one wire cable exposed portion (52a-1) reduces its length accordingly along the first lower rail (20R), while the foregoing another wire cable exposed portion (52a-2) is increasingly extended along the second lower rail (20L). Conversely, upon reverse operation of the drive unit (14) in the direction (R), the wire cable (52a) of the auxiliary follower wire element (52) is moved through the outer tube (52b) in the reverse arrow direction (R1) as in FIG. 6, and thus, the said one wire cable exposed portion (52a-1) is increasingly extended along the first lower rail (20R), while the said another wire cable exposed portion (52a-2) reduces its length accordingly along the second lower rail (20L).

Accordingly, this second alternative mode achieves the same effects and advantages as described in the first mode, so that the wire cable elements (16 and 52) themselves are not subjected to any damage and trouble by the deformation and twisting of long lower rails (20R, 20L), thereby insuring a smooth transmission therethrough of a drive force from the drive unit (14) to both two upper rails (18R, 18L).

Figure 9:
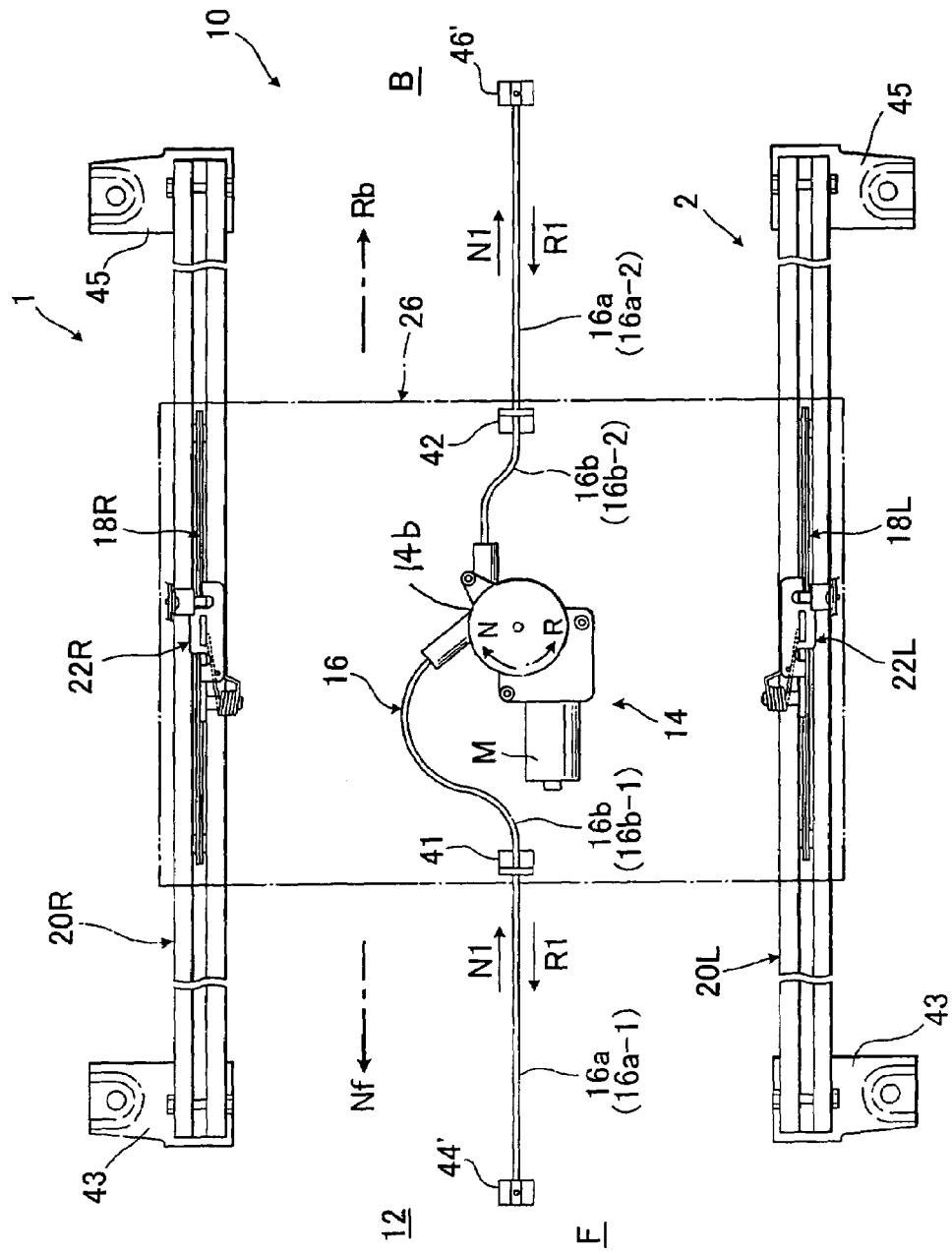
FIG. 9 is a partly broken schematic plan view showing a third alternative mode of the seat slide device.

FIG. 9 shows a third alternative embodiment of the slide device (10), according to which, the main drive transmission means (16) is simply arranged along one line extending in parallel with the first and second slide assemblies (1) (2), without addition of the auxiliary flexible wire cable element (52). Similarly to the foregoing embodiments, the first and second flexible wire elements (16-1) (16-2) are utilized in this embodiment, and therefore, no further description thereon is omitted. As shown, the first flexible wire element (16-1) extends forwardly from the drive unit (14) mounted on the seat riser member (26), while the second flexible wire element (16-2) extends backwardly therefrom.

Specifically, with regard to the first flexible wire element (16-1), one of its outer tube (16b-1) is firmly connected with a forward bracket (41) fixed on the seat riser member (26). As shown, the exposed wire cable portion (16a-1) is extended rectilinearly from the forward bracket (41) in the forward direction and terminates in one end fixedly connected with a forward securing lug member (44') fixed on the floor (12). On the other hand, with regard to the second flexible wire element (16-2), one of its outer tube (16b-2) is firmly connected with a backward bracket (42) fixed on the seat riser member (26), and the exposed wire cable portion (16a-2) thereof is extended rectilinearly from the backward bracket (42) in the backward direction. Of course, one end of the exposed wire cable portion (16a-2) is fixedly connected with the backward securing lug member (46') fixed on the floor (12).

With the foregoing arrangement, it is to be seen that forward and backward driving force is imparted from the drive unit (14) directly to both first and second upper rails (18R) (18L) via the seat riser member (26). In operation, normal operation of the drive unit (14) causes withdrawal of one wire cable (16a-1) thereinto, while extending another wire cable (16a-2) therefrom, thereby moving both first and second upper rails (18R) (18L) as well as the seat riser (26) or the seat (S) in the forward direction, as indicated by (Nf). Conversely, reverse operation of the drive unit (14) causes extension of the said one wire cable (16a-1) therefrom, while extending the said another wire cable (16a-2) thereinto, thereby moving both first and second upper rails (18R) (18L) as well as the seat riser member (26) or the seat (S) in the backward direction, as indicated by (Rb). This embodiment uses a very limited central line area on the floor (12) and it is so limited narrow region as to avoid substantive obstacle to usability of a space under the seat (S).

The slide device of the present invention is quite suited for a relatively large seat, such a bench seat, but may be used for a relatively small seat, such as a driver's seat or single seat. Of course, in place of the wire cable element, the flexible drive transmission elements (16, 52) may be formed by any other proper flexible materials, such as chains, tapes, belts or ropes.

While having described the present invention thus far, it should be understood that the invention is not limited to the illustrated embodiment, but any other modification, replacement, and addition will be applied thereto without departing from the scopes of the appended claims.

What is claimed is:

1. A slide device adapted for engagement with a seat and a floor of an automobile, comprising:
   a long lower track means fixed on said floor, said long lower track means having a forward end portion and a backward portion, wherein said forward end portion faces to a side forwardly of said seat, and said backward end portion faces to a side backwardly of said seat;
   said long lower track means being greater in length than said seat in forward and backward directions of said seat;
   an upper slide means slidably engaged on said long lower track means so as to be movable therealong in said forward and backward directions, said upper slide means having a forward end portion and further having a backward end portion, wherein said forward end portion faces to a side forwardly of said seat, whereas said backward end portion faces to a side backwardly of said seat;
   said upper slide means being connected with said seat and being slightly smaller in length than said seat;
   a locking means operable for locking and unlocking said upper slide means to and from said long lower track means;
   a drive means provided to said seat, said drive means being operable in one of a normal direction and a reverse direction;
   a first flexible drive transmission means including a forward portion extending in said forward direction, said first flexible drive transmission means having one end operatively connected with said drive means and another end connected with said forward end portion of said long lower track means;
   a second flexible drive transmission means including a backward portion extending in said backward direction, said second flexible drive transmission means having one end operatively connected with said drive means and another end connected with said backward end portion of said long lower track means; and
   a guide means provided to said seat, said guide means being adapted to guide said forward and backward portions respectively of said first and second flexible drive transmission means in a direction from said drive means to said long lower track means or vice versa,
   wherein said forward portion of said first flexible drive transmission means is partially contacted with said guide means as to insure that a whole of said forward portion of said first flexible drive transmission means, excepting a region thereof disposed under said seat, extends adjacent to and along said long lower track means,
   wherein said backward portion of said second flexible drive transmission means is partially connected with said guide means so as to insure that a whole of said backward portion of said first flexible drive transmission means, excepting a region thereof which is disposed under said seat, extends adjacent to and along said long lower track means,
   and
   wherein said drive means is arranged such that, when the drive means is operated in said normal direction, a corresponding normal drive force is generated therefrom to draw said first flexible drive transmission means into the drive means, while feeding said second flexible drive transmission means out of the drive means at the same time, thereby giving a forward thrust force via said guide means to said upper slide means which us thus moved in the forward direction along said long lower track means, so that said seat is moved in the forward direction, whereas conversely, when the drive means in operated in a reverse direction, a corresponding reverse drive force is generated therefrom to feed said first flexible drive transmission means out of the drive means, while drawing said second flexible transmission means into the drive means at the same time, thereby giving a backward thrust force via said guide means to said upper slide means which is thus moved in the backward direction along long lower track means, so that said seat is moved in the backward direction.

2. The slide device according to claim 1, wherein said guide means comprises at least one pulley rotatably provided to either said seat or said upper slide means.

3. The slide device according to claim 1, wherein said whole of said forward portion of said first flexible drive transmission means as well as said whole of said backward portion of said second flexible drive transmission means extend in and along said long lower track means.

4. A slide device adapted for engagement with a seat and a floor of an automobile, comprising:

a pair of long lower track elements fixed on said floor, said pair of long lower track elements having two forward end portions, respectively, and further having two backward end portions, respectively, wherein said two forward end portions face to a side forwardly of said seat, whereas said two backward end portions face to a side backwardly of said seat;

said pair of long lower track elements being greater in length than said seat in forward and backward directions of said seat;

a pair of upper slide elements slidably engaged on the respective said pair of long lower track elements so as to be moveable therealong in said forward and backward directions, said pair of upper slide elements having two forward end portions, respectively, and further having two backward end portions, respectively, wherein said two forward end portions face to a side forwardly of said seat, and said two backward end portions face to a side backwardly of said seat;

said pair of upper slide elements being connected with said seat and being slightly smaller in length than said seat;

a locking means operable for locking and unlocking said pair of upper side elements to and from said pair of long lower track elements;

a drive means provided at said seat, said drive means being operable in one of a normal direction and a reverse direction;

a first flexible drive transmission means including a forward portion extending in said forward direction, said first flexible drive transmission means having one end operatively connected with said drive means and another end connected with one of said two forward end portions respectively of said pair of long lower track elements;

a second flexible drive transmission means including a backward portion extending in said backward direction, said second flexible drive transmission means having one end operatively connected with said drive means and another end connected with one of said two backward end portions respectively of said pair of long lower track elements;

a guide means provided to said seat, said guide means being adapted to guide said forward and backward portions respectively of said first and second flexible drive transmission means in a direction from said drive means to said long lower track means or vice versa, wherein said forward portion of said first flexible drive transmission means is partially contacted with said guide means so as to insure that a whole of said forward portion of said first flexible drive transmission means, excepting a region thereof disposed under said seat extends adjacent to and long one of said pair of long lower track elements, wherein said backward portion of said second flexible drive transmission means is partially contacted with said guide means so as to insure that a whole of said backward portion of said second flexible drive transmission means, excepting a region thereof disposed under said seat, extends adjacent to and along another of said pair of long lower track elements, wherein, upon operation of said drive means in said normal direction, a corresponding normal drive force is transmitted through said first and second flexible drive transmission means to each of said pair of upper slide elements, thereby causing movement of both said pair of upper slide elements in the forward direction along the respective said pair of long lower track elements, so that said seat is moved in the forward direction, and wherein, upon operation of said drive means in said reverse direction, a corresponding reverse drive force is transmitted through said second flexible drive transmission means to each of said pair of upper side elements, thereby causing movement of both said pair of upper slide elements in the backward direction along the respective said pair of long lower track elements, so that said seat is moved in the backward direction, and a lock operation/control means arranged between said locking means and said drive means, said lock operation/control means being normally set in a locking position and operable therefrom toward one of the normal unlocking position and reverse unlocking position, such that, when the lock operation/control means is set in said locking position, both of said drive and locking means are in an inoperative state, that operation of the lock operation/control means in said normal unlocking position causes said locking means to unlock said pair of upper slide elements from the respective pair of long lower track elements, while simultaneously activating said drive means to operate in said normal direction, and that operation of the lock operation/control means in said reverse unlocking direction causes said locking means to unlock said pair of upper slide elements from the respective said pair of long lower track elements, while simultaneously activating said drive means to operate in said reverse direction;

said lock operation/control means including:

a lock operation means operable to a selected one of a first unlocking position and second unlocking position in relation to a neutral locking position, said lock operation means being operatively connected with said locking means, and being normally set in said neutral locking position, wherein said first unlocking position and said second locking position correspond to said normal and reverse unlocking directions, respectively, and a start switch means operable to a selected one of a normal switch-on position and a reverse switch-on position in relation to a neutral switch-off position, said start switch being electrically connected with said drive means and being normally set in said neutral switch-off position, wherein said normal and reverse switch-on positions correspond to said normal and reverse directions associated with said drive means, respectively, with such an arrangement that, when said lock operation/control means is set in said locking position, said lock operation means and said start switch means are set in said neutral locking position and said neutral switch-off position, respectively, whereby said pair of upper side elements are locked to the respective said pair of long lower track elements, that, when said lock operation/control means is operated is said normal unlocking direction, said lock operation means is operated in said first unlocking position to cause operation of said locking means to unlock said pair of upper slide elements from the respective said pair of long lower track elements, while simultaneously, said start switch means is operated to said normal switch-on position, which in turn causes said drive means to operate in said normal direction, thereby causing movement of said pair of upper side elements in said forward direction along the respective said pair of long lower track elements through said first flexible drive transmission means, and that, when said lock operation/control means is operated in said reverse unlocking direction, said lock operation means is operated in said reverse unlocking direction, said lock operation means is operated in said second unlocking position to cause operation of said locking means to unlock said pair of upper slide elements from the respective said pair of lower track elements, while simultaneously, said start switch means is operated to said reverse switch-on position, which in turn causes said drive means to operate in said reverse direction, thereby causing movement of said pair of upper slide elements in said backward direction along the respective said pair of lower track elements through said second flexible drive transmission means.

5. The slide device according to claim 4, wherein said guide means comprise at least one pulley rotatably provided to either each of said pair of upper slide means or said seat.

6. The slide device according to claim 4, wherein said whole of said forward portion of said first flexible drive transmission means as well as said whole of said backward portion of said second flexible drive transmission means extend in and along said long lower track means.

7. A slide device adapted for engagement with a seat and a floor of an automobile, comprising:

a pair of first and second slide assemblies, each comprising:

a) a long lower track means fixed on a side of said floor, said long lower track means having a forward end portion and a backward end portion, wherein said forward end portion faces to a side forwardly of said seat, and said backward end portion faces to a side backwardly of said seat, said long lower track means being greater in length than said seat in forward and backward directions of said seat, b) an upper slide means slidably engaged on said long lower track means so as to be movable therealong in said forward and backward directions, said upper slide means having a forward end portion, and further having a backward end portion, respectively, wherein said forward end portion faces to a side forwardly of said seat, and said backward end portion faces to a side backwardly of said seat, said upper slide means being connected with said seat and being slightly smaller in length than said seat;

a locking means operable for locking and unlocking said upper slide means to and from said long lower track means;

a drive means provided at said seat, said drive means being operable in one of a normal direction and a reverse direction;

a first flexible drive transmission means comprising a first flexible wire cable element having a forward portion extending in said forward direction, said first flexible wire cable element having one end operatively connected with said drive means and another end connected with one said forward end portion of said long lower track means;

a second flexible drive transmission means comprising a second flexible wire cable element having a backward portion extending in said backward direction, said second flexible wire cable element having one end operatively connected with said drive means and another end connected with said backward end portion of said long lower track means; and a guide means provided to said seat, said guide means being adapted to guide said forward portion of said first flexible wire cable element and said backward portion of said second flexible wire cable element in a direction from said drive means to said long lower track means or vice versa;

wherein said forward portion of said first wire cable element is partially contacted with said guide means so as to insure that a whole of said forward portion of said first wire cable element, excepting a region thereof disposed under said seat, extends adjacent to and along said long lower track means;

wherein said backward portion of said second wire cable element is partially contacted with said guide means so as to insure that a whole of said backward portion of said second wire cable element, excepting a region thereof disposed under said seat, extends adjacent to and along said long lower track means, and wherein said drive means is arranged such that, when the drive means is operated in said normal direction, a corresponding normal drive force is generated therefrom to draw said first flexible wire cable element into the drive means, while feeding said second flexible wire cable element out of the drive means at the same time, thereby giving a forward thrust force via said guide means to said upper slide means which is thus moved in the forward direction along said long lower track means, so that said seat is moved in the forward direction, whereas conversely, when the drive means is operated in a reverse direction, a corresponding reverse drive force is generated therefrom to feed said first flexible wire cable element out of the drive means, while drawing said second flexible wire cable into the drive means at the same time, thereby giving a backward thrust force via said guide means to said upper slide means which is thus moved in the backward direction along long lower track means so that said seat is moved in a backward direction.

8. The slide device according to claim 7, wherein each of said first and second flexible wire cable elements is formed by an outer tube and a wire cable slidably inserted in said outer tube.

9. The slide device according to claim 7, wherein said guide means comprises at least one first pulley element and at least one second pulley element;

wherein said long lower track means comprises a pair of long lower track elements fixed on said floor, said pair of long lower track elements having two forward end portions respectively, and further having two backward end portions, respectively, wherein said two forward end portions face to a side forwardly of said seat, and said two backward end portions face to a side backwardly of said seat;

wherein said upper slide comprises a pair of upper slide elements slidably engaged on the respective said pair of long lower track elements so as to be movable therealong in said forward and backward directions, said pair of upper slide elements having two forward end portions, respectively, and further having two backward end portions respectively, wherein said two forward end portions face to a side forwardly of said seat whereas said two backward end portions face to a side backwardly of said seat;

said pair of upper slide elements being connected with said seat and being slightly smaller in length than said seat;

wherein said first flexible wire cable element is formed by an outer tube and a wire cable slidably inserted in said outer tube, said wire cable having an exposed portion extending outwardly from said outer tube, said exposed portion corresponding to said forward portion of the first flexible wire cable element and extending adjacent to and along one said pair of lower track elements in the forward direction, while being in a partial contact about said at least one first pulley element and further connected at an end thereof with said floor, wherein said second flexible wire cable element is formed by an outer tube and a wire cable slidably inserted in said outer tube, said wire cable having an exposed portion extending outwardly from said outer tube, said exposed portion corresponding to said backward portion of the second flexible wire cable element and extending along said second lower track element in the backward direction, while being in a partial contact about said at least one second pulley element and further connected at the end thereof with said floor, whereby the normal and reverse drive forces are transmitted from said drive means to said pair of upper slide elements through said wire cables of said first and second flexible wire cable elements and said at least one first pulley element and said at least one second pulley element, thereby causing said pair of upper slide elements to move in the forward and backward directions along the respective said pair of long lower track elements, so that said seat is moved in the forward and backward directions.

10. The slide device according to claim 7, wherein said whole of said forward portion of said first flexible wire cable element as well as said whole of said backward portion of said second flexible wire cable element extend in and along said long lower track means.

11. The slide device according to claim 7, wherein said at least one first pulley element and said at least one second pulley element are rotatably provided to either said seat or said upper slide means.

12. The slide device according to claim 7, wherein said at least one first pulley element comprises two first pulleys, such that one of said two first pulleys is disposed at a lower end portion of each of said pair of upper slide element near to a corresponding one of said pair of long lower track elements, while another of said two first pulleys is disposed at a point above said one of said two first pulleys, wherein, likewise, said at least one second pulley element comprises two second pulleys, such that one of said two second pulleys is disposed at a lower end portion of each of said pair of upper slide element, near to corresponding another of said pair of long lower track elements, while another of said two second pulleys is disposed at a point above said one of said two second pulleys.

13. The slide device according to claim 7, wherein said long lower track means comprises a pair of long lower track elements and said upper rail means comprises a pair of upper rail elements which are slidably engaged on the respective said pair of long lower track elements, wherein the slide device further comprises an auxiliary flexible drive transmission element workable in conjunction with said first and second flexible wire cable elements to allow smooth transmission of said normal and reverse drive forces therethrough, thereby insuring movement of said upper rail elements in the forward and backward directions along the respective said pair of lower track elements, wherein said guide means comprises; a pair of first pulley elements rotatably provided to the respective said pair of upper slide elements; and a pair of second pulley elements rotatably provided to the respective said pair of upper slide elements, wherein said forward portion of said first flexible wire cable is in a partial contact about one of said pair of first pulley elements and extends adjacent to and along one of said pair of long lower elements in the forward direction, wherein said backward portion of said second flexible wire cable element is in a partial contact about one of said pair of second pulley elements and extends adjacent to and along another of said pair of long lower elements in the backward direction, and wherein said auxiliary flexible drive transmission element is disposed between said pair of first and second slide assemblies, in such a manner, that a substantially whole of one part of said auxiliary flexible drive transmission element, excepting a region thereof disposed under said seat, extends adjacent to and along said another of said pair of long lower track elements in a forward direction, while being in a partial contact about another of said pair of first pulley elements, whereas on the other hand, a substantially whole of another part of said auxiliary flexible drive transmission element, excepting a region thereof disposed under said seat, extends adjacent to and along said one of said pair of long lower track elements in the backward direction, while being in a partial contact about another of said pair of second pulley elements, whereby the normal and reverse drive forces are transmitted from said drive means to both of said pair of upper slide elements through said first and second flexible wire cable elements and said auxiliary flexible drive transmission elements as well as through said pair of said first and second pulley elements, thereby causing said pair of upper slide elements to move in the forward and backward directions along the respective said pair of long lower track elements, so that said seat is moved in the forward and backward directions.

14. The slide device according to claim 13, wherein said auxiliary flexible drive transmission element comprises an auxiliary flexible wire cable element formed by an outer tube having one end and another end, and a wire cable slidably inserted in said outer tube, said wire cable having:
one exposed portion extending outwardly from said one end of said outer tube, said one exposed portion corresponding to said substantially whole of one part of said auxiliary flexible drive transmission element, and extending adjacent to and along said another of said pair of lower track elements in the forward direction, while being in a partial contact about said another of said pair of first pulley elements; and
another exposed portion extending outwardly from said another end of said outer tube, said another exposed portion corresponding to said substantially whole of another part of said auxiliary flexible drive transmission element and extending adjacent to and along said one of said pair of lower track elements in the backward direction, while being in a partial contact about said another of said pair of said second pulley elements.

15. The slide device according to claim 7, wherein said guide means comprises at least two first pulley elements rotatably disposed at a forward region of said upper slide means which faces in said forward direction, wherein said guide means comprises at least two second pulley elements rotatably disposed at a backward region of said upper slide means which faces in said backward direction, wherein said forward portion of said first flexible wire cable element is in a partial contact about said at least two first pulley elements and extends therefrom adjacent to and along said first lower track element in the forward direction, while said backward portion of said second flexible wire cable element is in partial contact about said at least two second pulley elements and extends therefrom adjacent to and along said second lower track element in the backward direction.

16. The slide device according to claim 1, wherein the slide device comprises a pair of first and second slide assemblies, each including said long lower track means and said upper slide means, and said first and second flexible drive transmission means extends from said drive means substantially along a central line between said pair of first and second slide assemblies, such that said forward and backward portions respectively of the first and second flexible drive transmission means extend on and along said floor and are fixed at their respective ends to said floor.

17. The slide device as claimed in claim 7, wherein said lock means comprises a latch means movably provided in said first and second upper slide elements, said latch means being latchingly engageable and disengageable to and from said first and second lower track elements to thereby cause locking and unlocking of said first and second upper slide elements to and from said first and second lower track elements, wherein said lock operation/control means further includes: a detection means for detecting said latching engagement and disengagement of said pair of upper slide elements to and from said pair of lower track elements; and a delay relay means electrically connected between said drive means and said start switch means, said delay relay means being workable for giving a predetermined delay time prior to said drive means ceasing its operation when said operation lever is operated in said neutral locking position, wherein said lock operation means and said start switch means comprise a combination of a switch element and an actuator, wherein said switch element is electrically connected with said actuator and said drive means via an electronic controller and a delay relay means, wherein said switch element corresponds to said start switch means and thus is operable to a selected one of said normal and reverse switch-on positions in relation to said neutral switch-off position in which the switch element is normally set, and wherein said actuator is operatively connected with said latch means, with such an arrangement that operation of said switch element in either of said normal and reverse switch-on positions results in operation of said actuator to cause said disengagement of said latch means from said pair of lower track elements, that, when said switch element is operated in one of said normal and reverse switch-on positions, said drive means is not operated in neither of said normal and reverse directions until said detection means detects said latching disengagement of said latch means from said pair of lower track elements, and that, during operation of said driven means in one of said normal and reverse directions, when said switch element is operated in said neutral locking position, said drive means continues to operate for said predetermined delay time and until said detection means detects said latching engagement of said latch means with said pair of lower track element.

* * * * *